United States Patent
Woodworth, Jr.

(10) Patent No.: US 10,783,239 B2
(45) Date of Patent: *Sep. 22, 2020

(54) SYSTEM, METHOD, AND APPARATUS FOR COMPUTER SECURITY

(71) Applicant: PC Pitstop, Inc, Sioux City, IA (US)

(72) Inventor: Robert J. Woodworth, Jr., Charleston, SC (US)

(73) Assignee: PC MATIC, INC., Sioux City, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,086

(22) Filed: Dec. 14, 2018

(65) Prior Publication Data
US 2019/0121959 A1    Apr. 25, 2019

Related U.S. Application Data

(63) Continuation-in-part of application No. 15/666,212, filed on Aug. 1, 2017.

(51) Int. Cl.
*G06F 21/51*     (2013.01)
*G06F 21/53*     (2013.01)
(Continued)

(52) U.S. Cl.
CPC .............. *G06F 21/51* (2013.01); *G06F 21/53* (2013.01); *G06F 21/563* (2013.01);
(Continued)

(58) Field of Classification Search
CPC ........ G06F 21/51; G06F 21/53; G06F 21/563; G06F 21/564; G06F 21/566;
(Continued)

(56) References Cited

U.S. PATENT DOCUMENTS

| | | | | |
|---|---|---|---|---|
| 7,565,686 B1 * | 7/2009 | Sobel | ...................... | G06F 21/51 |
| | | | | 713/164 |
| 7,698,744 B2 * | 4/2010 | Fanton | .................... | H04L 63/08 |
| | | | | 726/27 |

(Continued)

FOREIGN PATENT DOCUMENTS

| | | | | |
|---|---|---|---|---|
| CN | 103839000 A | * | 6/2014 | ......... H04L 63/1491 |
| GB | 2554390 B | * | 10/2018 | |

OTHER PUBLICATIONS

Google Translation of CN10839000 (Year: 2014).*
(Continued)

*Primary Examiner* — Luu T Pham
*Assistant Examiner* — James J Wilcox
(74) *Attorney, Agent, or Firm* — D2 Worldwide LLC; Frank Liebenow

(57) ABSTRACT

A system for protecting a computer from malicious software uses a whitelist to determine is a program is safe to run. As new malicious software is created, attempts at execution of executables including such malicious software are prevented being that the new malicious software is not listed in the whitelist. When such attempts are made, the executable is forwarded to a server where further analysis is performed to determine if the executable contains suspect code (e.g., malicious software) including running the executable in a sandbox to analyze how the executable behaves and running industry virus scanners against the executable to see if those scanners can find a virus. If such research finds that the executable is well-behaved, the executable is added to the whitelist and future execution is allowed.

18 Claims, 15 Drawing Sheets

(51) Int. Cl.
*G06F 21/56* (2013.01)
*H04L 29/06* (2006.01)

(52) U.S. Cl.
CPC .......... *G06F 21/564* (2013.01); *G06F 21/566* (2013.01); *H04L 63/00* (2013.01); *H04L 63/101* (2013.01); *H04L 63/145* (2013.01); *G06F 2221/033* (2013.01); *G06F 2221/2141* (2013.01)

(58) Field of Classification Search
CPC ....... G06F 2221/033; G06F 2221/2141; H04L 63/00; H04L 63/101; H04L 63/145
See application file for complete search history.

(56) References Cited

U.S. PATENT DOCUMENTS

| | | | | |
|---|---|---|---|---|
| 8,316,446 B1* | 11/2012 | Campbell | ............. | G06F 21/554 380/201 |
| 8,621,238 B1* | 12/2013 | Kimball | ................ | G06F 21/51 711/100 |
| 8,732,476 B1* | 5/2014 | Van | ................. | H04L 67/141 713/182 |
| 8,850,579 B1* | 9/2014 | Kalinichenko | ......... | G06F 21/53 726/22 |
| 8,925,101 B2* | 12/2014 | Bhargava | ............... | G06F 21/54 726/27 |
| 9,558,355 B2* | 1/2017 | Madou | .................... | G06F 16/24 |
| 9,571,518 B2* | 2/2017 | Hu | ....................... | H04L 63/145 |
| 9,680,873 B1* | 6/2017 | Halls | ...................... | H04L 63/08 |
| 10,296,737 B2* | 5/2019 | Bello | ...................... | G06F 21/51 |
| 2007/0028110 A1* | 2/2007 | Brennan | ............... | G06F 21/552 713/176 |
| 2008/0016339 A1* | 1/2008 | Shukla | ................. | G06F 21/566 713/164 |
| 2011/0029772 A1* | 2/2011 | Fanton | ................... | G06F 21/10 713/165 |
| 2011/0047620 A1* | 2/2011 | Mahaffey | ............. | G06F 21/564 726/23 |
| 2011/0185417 A1* | 7/2011 | Zhou | ..................... | G06F 21/566 726/22 |
| 2013/0097659 A1* | 4/2013 | Das | ....................... | H04W 12/08 726/1 |
| 2013/0298244 A1* | 11/2013 | Kumar | ................... | H04L 67/10 726/25 |
| 2014/0298460 A1* | 10/2014 | Xue | .................... | H04L 63/1425 726/23 |
| 2015/0319136 A1* | 11/2015 | Xie | ..................... | H04L 63/1425 726/11 |
| 2015/0332043 A1* | 11/2015 | Russello | ................. | G06F 11/30 726/23 |
| 2016/0323106 A1* | 11/2016 | Roper | .................... | G06F 21/51 |
| 2017/0098071 A1* | 4/2017 | Stopel | .................... | G06F 21/51 |
| 2017/0118228 A1* | 4/2017 | Cp | ........................ | H04L 63/145 |
| 2017/0132411 A1* | 5/2017 | Salajegheh | ............ | G06F 21/53 |
| 2017/0163673 A1* | 6/2017 | Nantel | ................ | H04L 63/1425 |
| 2017/0206357 A1* | 7/2017 | Gorelik | ................... | G06F 21/52 |
| 2017/0214530 A1* | 7/2017 | Seibel | .................... | G06F 21/53 |
| 2017/0237749 A1* | 8/2017 | Wood | .................... | H04L 63/145 726/23 |
| 2017/0300697 A1* | 10/2017 | Iyer | ........................ | G06F 21/57 |
| 2018/0198806 A1* | 7/2018 | Gopalakrishna | .... | H04L 63/1491 |
| 2018/0316694 A1* | 11/2018 | Thakar | ................ | H04L 63/1416 |
| 2018/0316697 A1* | 11/2018 | Mittig | ................... | G06F 21/566 |
| 2018/0357416 A1* | 12/2018 | Ashkenazi | ............. | G06F 21/50 |
| 2018/0373877 A1* | 12/2018 | Bruso | ..................... | G06F 21/78 |
| 2019/0005227 A1* | 1/2019 | Weinstein | ............... | H04L 63/08 |
| 2019/0007257 A1* | 1/2019 | Weinstein | ........... | H04L 63/0227 |
| 2019/0007436 A1* | 1/2019 | Dods | .................... | H04L 63/145 |

OTHER PUBLICATIONS

Yoshioka—"Vulnerability in Public Malware Sandbox Analysis Systems," 2010 10th Annual International Symposium on Applications and the Internet, pp. 265-268 (Year: 2010).*

Min—"Filtering Malicious Routines in Web Browsers Using Dynamic Binary Instrumentation," 2012, pp. 554-557 (Year: 2012).*

* cited by examiner

SYSTEM, METHOD, AND APPARATUS FOR COMPUTER SECURITY

CROSS-REFERENCE TO RELATED APPLICATION

This application is a continuation-in-part of U.S. patent application Ser. No. 15/666,212, filed Aug. 1, 2017, the disclosure of which is hereby incorporated by reference.

FIELD

This invention relates to computer security and more particularly to a system for providing enhanced security through the use of white lists.

BACKGROUND

Currently, many software systems attempt to provide a secure computing environment. Such systems are typically referred to as firewalls, anti-malware software, etc. Any computer (including cellular phones) that is connected to a network is subject to intrusion via that network.

One form of intrusion is possible when the target computer is poorly administered, leaving it accessible from other computers on the network. This is typically a firewall and/or permissions issue.

Another form of intrusion is possible by logging into the computer from another computer on a network. This type of intrusion typically requires knowledge of a username and password. Intrusion is usually accomplished when the user creates an easily discoverable password (e.g. the user's last name followed by a '1') or when the user does not safeguard the password. An example of such lack of safeguarding the password is by writing the password on a sticky note that is adhered to the computer or by entering the password in a public place where another might see the password or the keystrokes being typed.

Today, many intrusions start with reception of malicious software. Malicious software is typically a software program that is installed on the user's computer sometime without permission or knowledge of the user. In some instances, the malicious software is delivered to the user in an email, typically an attached file. Upon opening of the file, the malicious software is copied onto the user's computer storage and begins to run. Many malicious software programs start out by sending duplicate copies of the malicious software to everybody on the user's email list, also known as a "worm". Unsuspecting friends of the user receive a message they think was sent by the user and, trusting the user, the friends open the message, thereby infecting the friend's computer with the malicious software.

Existing anti-malware software typically relies solely on a blacklist approach to reduce intrusion from malicious software. A blacklist is a record of all currently recognized malicious software. With anti-malware software that uses the blacklisting method, when an executable program tries to run, the blacklist anti-malware software scans the program, looking for signatures that match a signature in a blacklist. As new forms or versions of malicious software are deployed, typically, anti-malware users are subject to being infected by new/previously undetected malicious software until signatures are created for the new malicious software, the signatures are added to the blacklist, and the updated blacklist is distributed to users of the anti-malware software, through software updates or from the cloud.

Unfortunately, from the time a new malicious software is introduced to when it is detected, added to the blacklist, and distribute to each user's anti-malware software, there is a window of opportunity for intrusion by the new malicious software. If a user's anti-malware software blacklist is not updated with the new malicious software signature, the new malicious software can infect the user's computer when the user executes the new malicious software; for example by opening an attachment that contains the new malicious software. The anti-malware software will not recognize the attachment as malicious because the attachment is not presently in the black list. Therefore, the new malicious software will be allowed to execute.

The answer to this problem is a system that will protect from malicious software, both previously recognized, and brand new malicious software.

SUMMARY

A system for protecting a computer from malicious software is described. The system uses one or more whitelist of trusted programs to determine if a program is safe to run. As new software is introduced, downloaded and run (attempted) by users, execution is prevented until it is verified that the new software is absent of malware, as the new software is not listed in the whitelist of trusted programs.

In one embodiment, the system for protecting a computer includes providing two whitelists; one whitelist for signed executables, and a second whitelist for unsigned executables. Upon an attempt to initiate an executable on the computer, the system determines if the executable is signed, and if so, the first whitelist is scanned, to see if the executable is present. If present on the signed executables whitelist, the executable is allowed to run. If the executable is unsigned, the second whitelist is scanned to see if the executable is present. If the program is on the whitelist of unsigned executables, the executable is allowed to run.

If the executable is not found in the respective whitelist, the executable, metadata of the executable, or all or a portion of the executable is forwarded to a server (remote system), analyzed using heuristics, and a determination is made as to whether the executable contains malicious software or not (e.g., is malicious). If malicious software is found in the executable, notification regarding the malicious software is made. If malicious software doesn't exist in the executable, the respective whitelist is updated and the server communicates to the computer, that the executable is allowed to run. If it is determined that there may be malicious software in the executable, the executable is prevented from running, and queued for further research.

In another embodiment, a method of protecting a computer includes providing two whitelists; the first whitelist for signed executables, and the second whitelist for unsigned executables. Upon an attempt to initiate an executable on the computer, first, it is determined if the executable is signed. If the executable is signed, the first whitelist is scanned to see if the executable is present, and if so, the executable is allowed to run on the computer. If the executable is unsigned, the second whitelist is scanned to see if the executable is present, and if so, the executable is allowed to run on the computer.

If the executable is not found in the respective whitelist, the executable is forwarded to the server and analyzed at the server, using heuristics, to determine if malicious software exists in the executable. If it is determined that malicious software exists in the executable, execution is blocked and the user is notified that the executable contains malicious software. If the executable does not contain malicious software, the respective whitelist for signed/unsigned programs is updated, and the computer is notified that it is safe to run the executable. If it is determined that there may be malicious software in the executable, the executable is prevented from running, and queued for further research In another embodiment, program instructions tangibly embodied in a non-transitory storage medium, containing at least one instruction for providing security to a computer. At least one computer readable instruction running on the computer, determines when an executable attempts to initiate. Upon an attempt to initiate the executable on the computer, the computer readable instructions, running on the computer, determine if the executable is signed or unsigned. If the executable is signed, the computer readable instructions, running on the computer, search the whitelist of signed executables to see if the executable is present. If the executable is present on the first whitelist, the computer readable instructions, running on the computer, allow the executable to run. If the executable is unsigned, the computer readable instructions, running on the computer, search the whitelist of unsigned executables to see if the executable is present. If the executable is present on the second whitelist, of unsigned executables, the computer readable instructions, running on the computer, allow the executable to run. If the executable is found neither on the signed executables whitelist, nor the unsigned executables whitelist, the computer readable instructions, running on the computer, forward the executable to a server. Once the executable in question is on the server, the computer readable instructions, running on the server, analyze the executable, using heuristics, to determine if malicious software exists in the executable. If malicious software exists, the computer readable instructions, running on the server, notify the user (e.g. email a user) regarding the discovery of malicious software. If malicious software is not present in the executable, the computer readable instructions, running on the server, updates the respective whitelist for signed/unsigned executables, and the computer is notified that it is safe to run the executable. If the computer readable instructions running on the server determine that there may be malicious software in the executable, the executable is prevented from running, and queued for further research.

In another embodiment, a system for computer security includes at least one whitelist and at least one blacklist and a server, the server having storage. There is a computer protected by the system for computer security. Software running on the computer detects an attempt to run an application and determines if the application is in the at least one whitelist. If the application is present in the at least one whitelist, the software running on the computer allows the running of the application. If not, the software running on the computer determines if the application is in the at least one blacklist and if the application is present in the at least one blacklist, the software prevents the running of the application. If the application is not found in the at least one whitelist and the application is not found in the at least one blacklist, at least a portion of the application is forwarded to the server for further analyzes by the software running on the computer. At the server, a researcher selects one application(s) for analysis and performs the analysis on the one application(s) by running one or more industry virus scanners against the one application(s). If any of the one or more industry virus scanners detects that malicious software exists in the application(s), the application(s) are added to at least one of the at least one blacklist and future execution of the application(s) is blocked. If the one or more industry virus scanners fail to detect any malicious software in the application(s), then further analysis is performed (e.g., the application is run in a sandbox). If the further analysis indicates that no malicious software exists in the application(s), the server updates one or more of the at least one whitelist and the server communicates with the computer to allow future executions of the application(s). If the further analysis indicates that that there may be malicious software in the application(s), the application(s) are added to at least one of the at least one blacklist and execution of the application(s) is blocked. Note that in some embodiments, the outputs of the industry virus scanners are weighted (e.g. some produce false positives) and some amount of concurrence (e.g. a threshold value is exceeded) between the industry virus scanners is needed before the application is cleared, otherwise, the application is sent for further analysis.

In another embodiment, a method of protecting a computer includes providing a whitelist at the computer, the whitelist having identifications for known applications that are believed safe to run. Upon an attempt to initiate an application on the computer, determining if the application corresponds to one of the identifications in the whitelist and if the application corresponds to any one of the identifications in the whitelist, allowing the application to run. If the application does not correspond to one of the identifications in the whitelist, forwarding the application to a server. Upon reception of the executable, the server places the application in queue for a researcher. The researcher selects the application and uses one or more industry virus scanners to evaluate the application. If the evaluation determines a virus is present in the application, the application is added to a blacklist, and future execution of the application is. If none of the one or more industry virus scanners detect a virus in the application, the researcher performs additional analysis on the application (e.g. runs the application in a sandbox, searches for strings in the application, etc.). If the additional analysis indicates that no virus has been found, the whitelist is updated and communications with the computer allow future executions of the application on the computer. If the additional analysis indicates that a virus has been found in the application, notification is made regarding the virus, the application is added to the blacklist, and the application is prevented from running on the computer. Note that in some embodiments, the outputs of the industry virus scanners are weighted (e.g. some produce false positives) and some amount of concurrence (e.g. a threshold value is exceeded) between the industry virus scanners is needed before the application is cleared, otherwise, the application is sent for further analysis.

In another embodiment, program instructions tangibly embodied in a non-transitory storage medium, containing at least one instruction for providing security to a computer. Computer readable instructions running on the computer determine when an application attempts to initiate on the computer and upon the attempt to initiate the application on the computer, the computer readable instructions running on the computer determine if the application is present in a whitelist. If the executable is present in the whitelist, the computer readable instructions running on the computer allow the executable to run. If the executable is not present in the whitelist, the computer readable instructions running on the computer forward the executable and an execution environment to a server (e.g. for further analysis). Computer readable instructions running on the server evaluate the executable using at least one industry virus scanner (e.g. running licensed copies of virus software or uploading to a service of virus software). If this evaluation finds a virus, the computer readable instructions running on the server adds the application to a blacklist to prevent future execution of the application. If the evaluation does not find a virus, the computer readable instructions running on the server initializes a sandbox, loads the application into a sandbox along with the execution environment and runs the application in the sandbox. If a researcher finds that, after the application runs in the sandbox, malicious changes were made to a registry of the sandbox, malicious file activities were made by the application, malicious communications were made by the application and/or malicious information was attempted to be displayed, the computer readable instructions running on the server adds the application to a blacklist to prevent future execution of the application. If the researcher does not find that, after the application runs in the sandbox, the malicious changes were made to the registry of the sandbox, the malicious file activities were made by the application, the malicious communications were made by the application and/or the malicious information was attempted to be displayed, the researcher searches the application for known strings using one or more regular expressions, the known strings being associated with known viruses. If the researcher finds one or more of the known strings associated with the known viruses, the computer readable instructions running on the server adds the application to a blacklist to prevent future execution of the application. If the researcher does not find any of the known strings associated with the known viruses, the computer readable instructions running on the server adds the application to the whitelist to allow future execution of the application on the computer. Note that in some embodiments, the outputs of the industry virus scanners are weighted (e.g. some produce false positives) and some amount of concurrence (e.g. a threshold value is exceeded) between the industry virus scanners is needed before the application is cleared, otherwise, the application is sent for further analysis.

BRIEF DESCRIPTION OF THE DRAWINGS

The invention can be best understood by those having ordinary skill in the art, by referencing the following detailed description when considering the accompanying drawings, in which.

DETAILED DESCRIPTION

Figure 1:
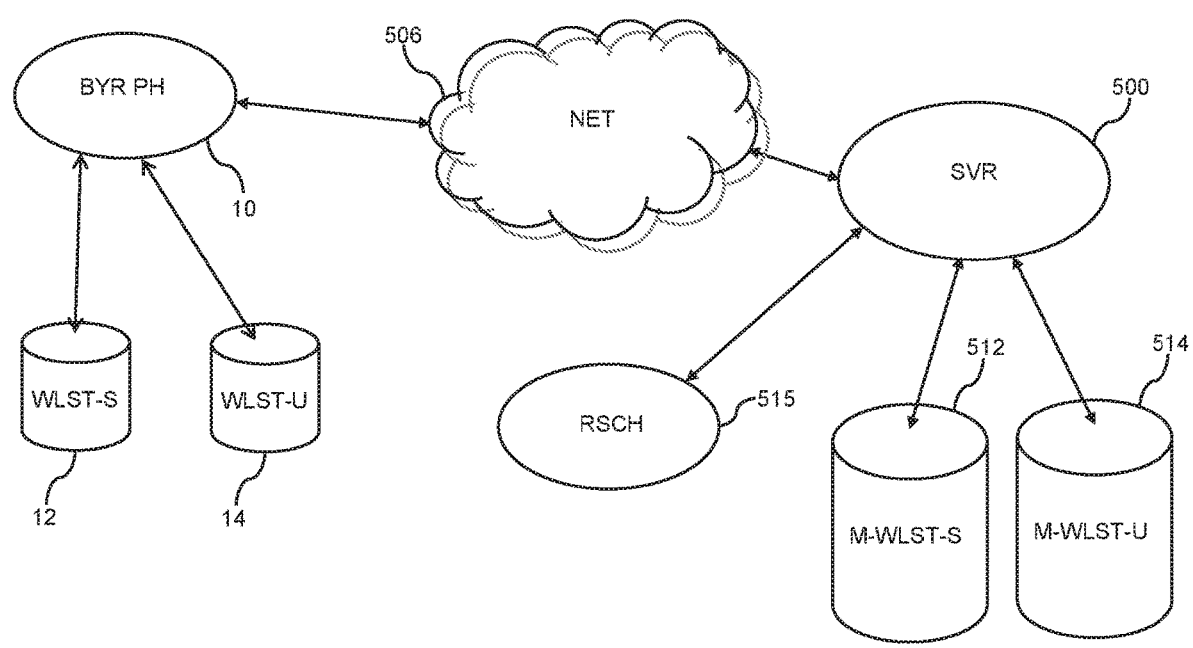
FIG. 1 illustrates a data connection diagram of the computer security system.

Reference will now be made in detail to the presently preferred embodiments of the invention, examples of which are illustrated in the accompanying drawings. Throughout the following detailed description, the same reference numerals refer to the same elements in all figures.

In general, the computer security system provides an automated way to prevent execution of software containing code that is contaminated (e.g. contains or is malicious software). Before execution of any code, a test is performed to assure that the code is safe. The test includes checking one or more whitelists to determine if the code has been previously tested for malicious software and if the code is on the whitelist, allowing execution of the code. Otherwise, the computer security system blocks execution.

Throughout this description, the term, "computer" refers to any system that has a processor and runs software. One example of such is a personal computer. The term, "user" refers to a human that has an interest in the computer, perhaps a user who is using the computer.

Throughout this description, the term, "malicious software" or "malware" refers to any software having ill-intent. Many forms of malicious software are known; some that destroy data on the host computer, some that capture information such as account numbers, passwords, etc., some that fish for information (phishing), pretending to be a known entity, to fool the user into providing information such as bank account numbers, some encrypt data on the computer and hold the data at ransom, etc. A computer virus is a form of malicious software.

In general, the user of the system, method, and apparatus being described utilizes efficient storage and retrieval mechanisms to determine if a program (e.g. an executable, macro, form, etc.) is identified within a list. A hash table is one such mechanism, though other mechanisms are equally anticipated and included here within. As an efficient way of characterizing the questionable program, in some embodiments, it is anticipated that rather than storing the entire program in such tables, a portion of the program is stored, often referred to as a signature of the program. The signature contains key sequences found within the program; finding of such key sequences typically indicates that the program matches the signature.

Referring to FIG. 1 illustrates a data connection diagram of the exemplary computer security system. In this example, a computer 10 (e.g., personal computer) communicates through a network 506 (e.g. the Internet, local area network, etc.) to a server computer 500.

The server computer 500 has access to data storage for maintaining the whitelists; for example, a whitelist for signed applications 512 and a whitelist for unsigned applications 514. In some embodiments, the storage is in the cloud. In some embodiments, the whitelists 512/514 are cached in storage of the computer 10 being protected.

Although one path between the computer 10 and the server 500 is shown going through the network 506 as shown, any known data path is anticipated. For example, the Wi-Fi transceiver 96 (see FIG. 2) of the computer 10 is used to communicate with the wide area network 506, which includes the Internet, and, consequently, with the server computer 500.

The server computer 500 transacts with software running on the computer 10 through the network(s) 506. The software monitors any activation of software (e.g. running of a program) and provides permission for running the software on the computer 10 when the software is deemed malicious software-free. Information is also transferred to the server regarding potential threats, etc.

The server computer 500 transacts with the portion of the computer security system that runs on the computer 10 as needed, for example, to update local whitelists 12/14.

The computer security system selectively provides execution approval to software that attempts to execute on the computer 10. In such, if approval is provided, the software is able to execute on the computer 10. If approval is not provided, the software is blocked from executing on the computer 10 and various additional steps are taken such as logging the attempt, transferring the suspect software to the server 500 for analysis, informing the user of the computer 10, etc.

Figure 2:
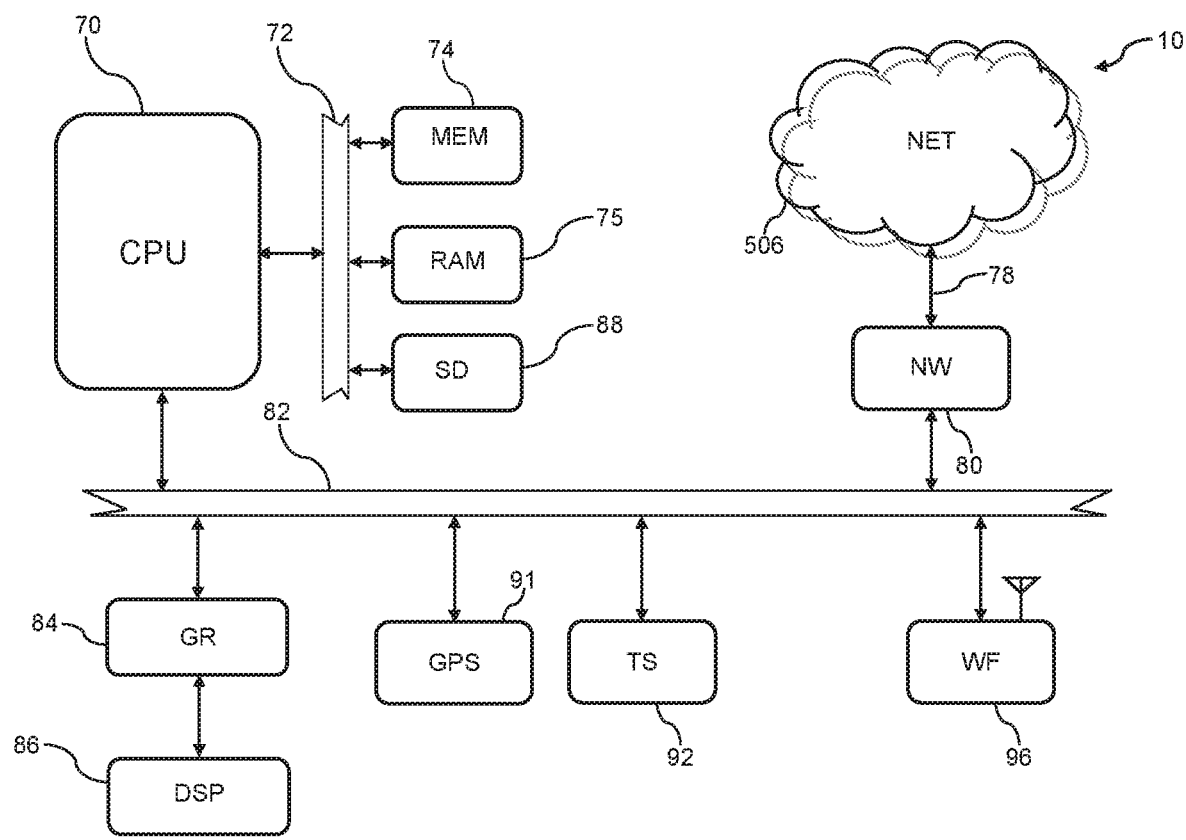
FIG. 2 illustrates a schematic view of a typical computer protected by the computer security system.

Referring to FIG. 2, a schematic view of a typical computer 10 is shown. A client-side of the computer security system runs on a processor-based device (e.g., computer 10) for providing protection against software that contains malicious software. The present invention is in no way limited to a computer 10, known as a personal computer. Many other processor-based devices are equally anticipated including, but not limited to smart phones, cellular phones, portable digital assistants, routers, thermostats, fitness devices, etc.

The example computer 10 represents a typical device used for accessing user interfaces of the computer security system. This exemplary computer 10 is shown in its simplest form. Different architectures are known that accomplish similar results in a similar fashion, and the present invention is not limited in any way to any particular computer 10 system architecture or implementation. In this exemplary computer 10, a processor 70 executes or runs programs in a random access memory 75. The programs are generally stored within a persistent memory 74 and loaded into the random access memory 75 when needed. In some computers 10, a removable storage slot 88 (e.g., compact flash, SD) offers removable persistent storage. The processor 70 is any processor, typically a processor designed for phones. The persistent memory 74, random access memory 75, and SIM card are connected to the processor by, for example, a memory bus 72. The random access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary computer 10, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the removable storage 88 is used to store programs, executable code, phone numbers, contacts, and data, etc. In some embodiments, other data is stored in the persistent memory 74 such as audio files, video files, text messages, etc.

The peripherals are examples, and other devices are known in the industry such as Global Positioning Subsystems, speakers, microphones, USB interfaces, cameras, microphones, Bluetooth transceivers, Wi-Fi transceivers 96, image sensors, temperature sensors, etc., the details of which are not shown for brevity and clarity reasons.

The network interface 80 connects the computer 10 to the network 506 through any known or future protocol such as Ethernet, Wi-Fi, GSM, TDMA, LTE, etc., through a wired or wireless medium 78. There is no limitation on the type of cellular connection used. The network interface 80 provides data and messaging connections between the computer 10 and the server through the network 506.

Figure 3:
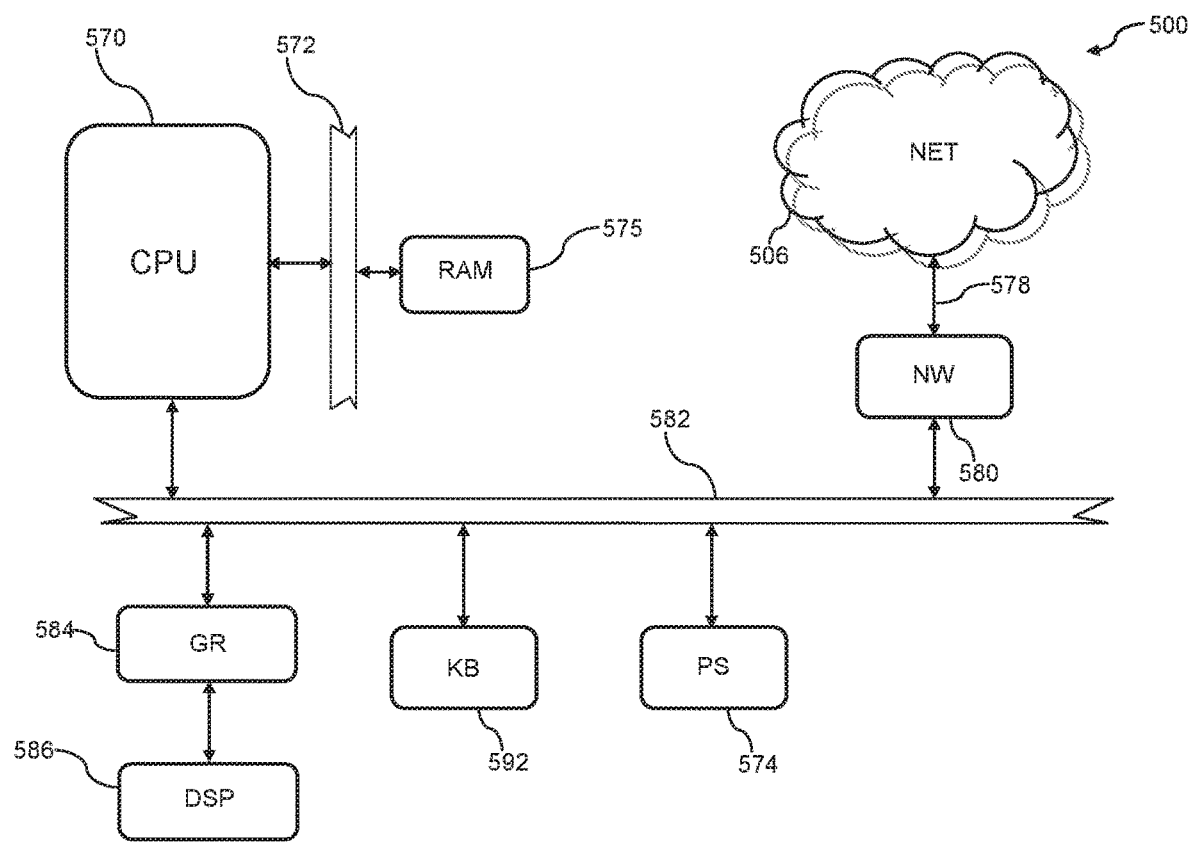
FIG. 3 illustrates a schematic view of a typical server computer system.

Referring to FIG. 3, a schematic view of a typical server computer system (e.g., server 500) is shown. The example server computer system 500 represents a typical server computer system used for back-end processing, generating reports, displaying data, etc. This exemplary server computer system 500 is shown in its simplest form. Different architectures are known that accomplish similar results in a similar fashion and the present invention is not limited in any way to any particular computer system architecture or implementation. In this exemplary computer system, a processor 570 executes or runs programs in a random access memory 575. The programs are generally stored within a persistent memory 574 and loaded into the random access memory 575 when needed. The processor 570 is any processor, typically a processor designed for computer systems with any number of core processing elements, etc. The random access memory 575 is connected to the processor by, for example, a memory bus 572. The random access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 is typically interfaced to the processor 570 through a system bus 582, or any other interface as known in the industry.

Also shown connected to the processor 570 through the system bus 582 is a network interface 580 (e.g., for connecting to a data network 506), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, data, contacts, and other data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Figure 4:
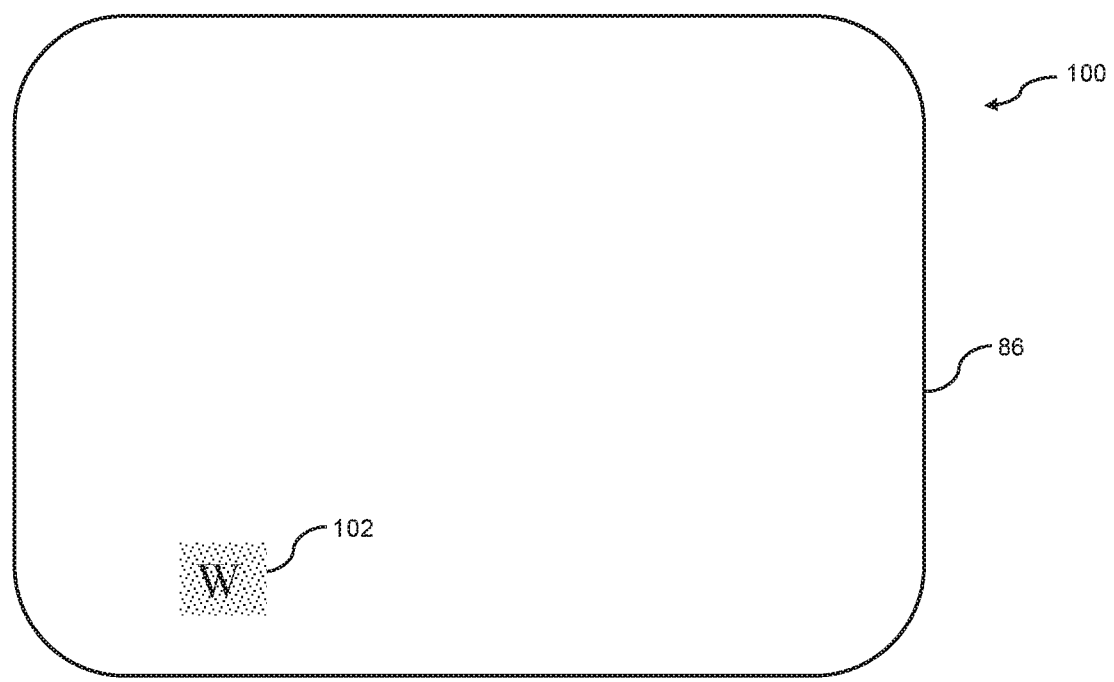
FIG. 4 illustrates a computer user interface of the computer security system.
Figure 5:
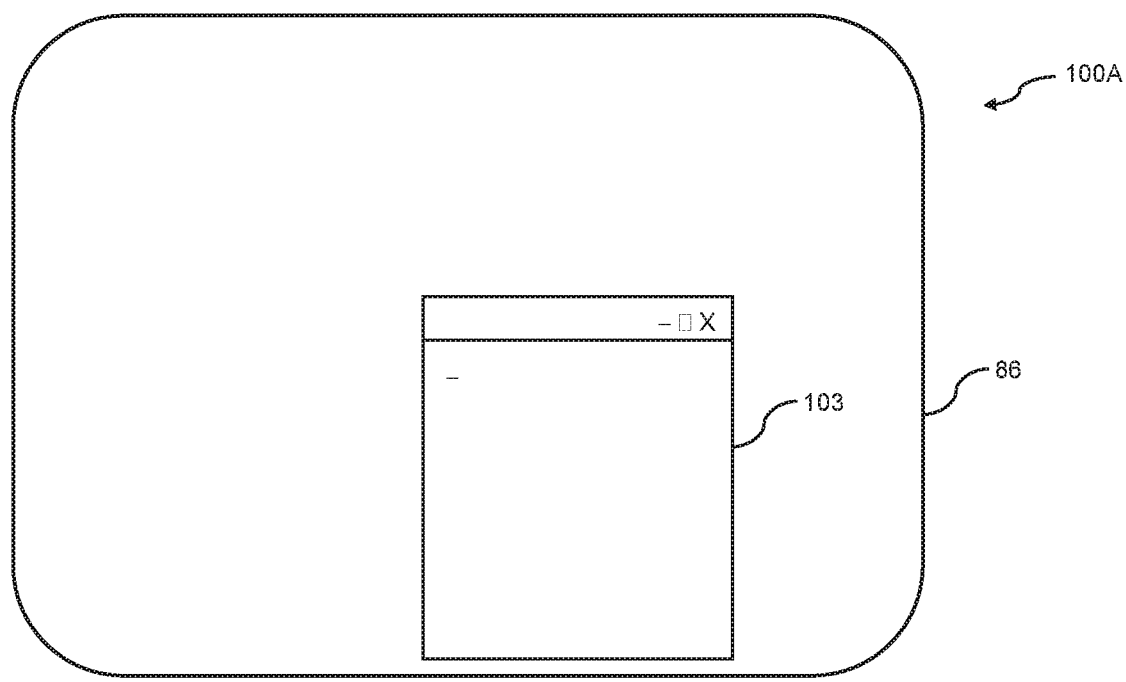
FIG. 5 illustrates a second computer user interface of the computer security system.
Figure 6:
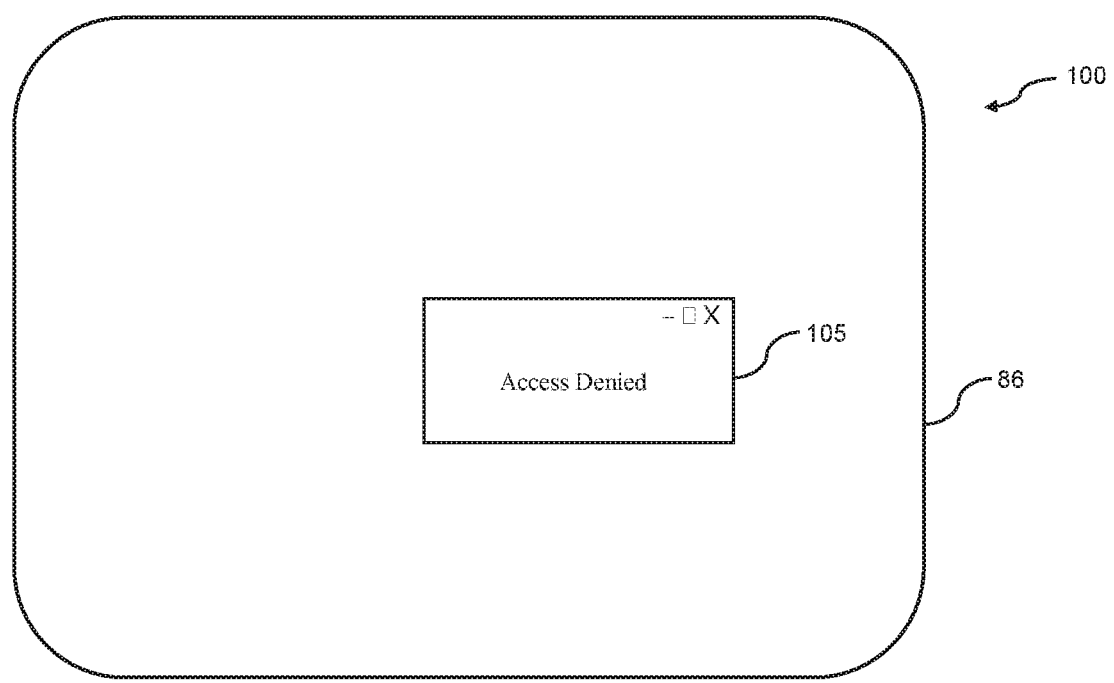
FIG. 6 illustrates a third computer user interface of the computer security system.

Referring to FIGS. 4-6, exemplary user interfaces 100, 100A, 100B of the computer security system are shown. Although many user interfaces are anticipated, one set of examples are shown for brevity reasons. The user interfaces 100, 100A, 100B that are shown represent that a program is stored on the computer 10 and is ready for execution. There are many ways for software to get loaded and executed on the computer 10, for example, through an email system, through a browser, through a forms interface, etc. The computer security system intercepts and processes all requests to initiate operation of any type of program.

One such example of a program ready to be run is shown in a user interface 100 of FIG. 4. A word processing program is represented as an icon 102 on a user's display 86. As with many windowing programs, a user typically selects the icon 102, usually double-clicking over the icon 102, and the program initiates.

After the user selects the icon 102 (e.g. double clicking), a program associated with the icon 102 attempts to run. The computer security system analyzes the program associated with the icon 102 and determines if it is known that this program is not malicious software, as will be described in the program flow of FIGS. 8-10.

If it is determined that the program is not malicious software, the program is allowed to execute as shown in a user interface 100A of FIG. 5, displaying a user interface window 103.

If it is determined that the program is potentially malicious software, the program is prevented from executing and a user interface 100B of FIG. 6 is presented, displaying an error message window 105.

Figure 7:
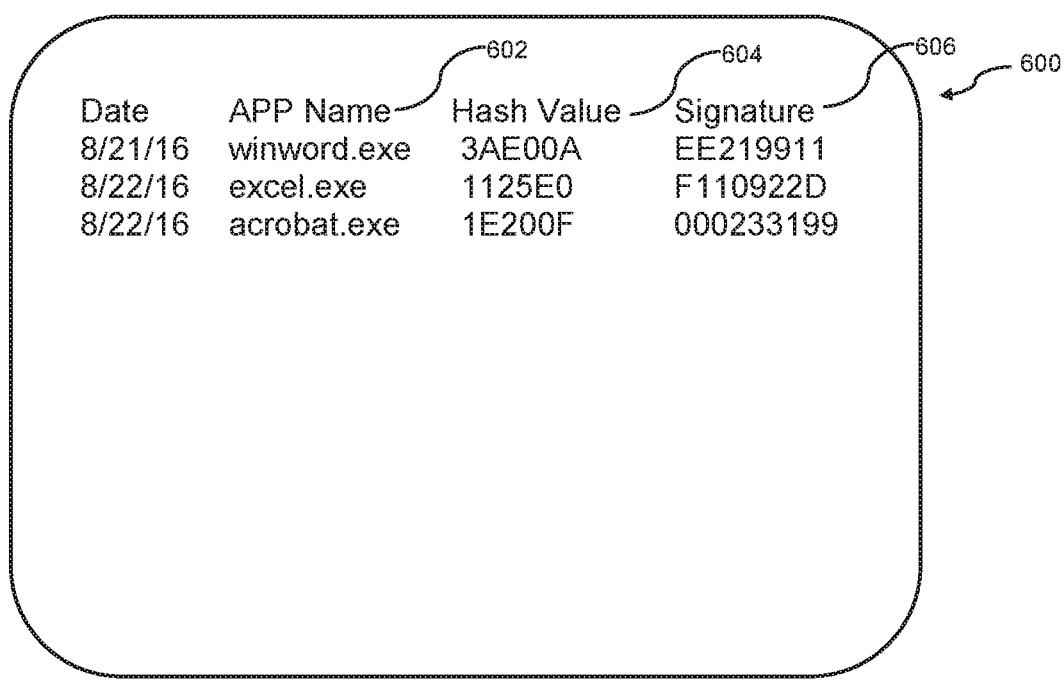
FIG. 7 illustrates an exemplary white list of the computer security system.

The table of FIG. 7 depicts one implementation of a whitelist table 600. As there are a huge number of known malicious programs, it is anticipated that such a whitelist table 600 be implemented as a hash table. In that, the program name is used as a key to find an index value into the whitelist table 600 as understood in the field of programming.

Each entry of the whitelist table 600 includes information regarding the approved program such as the date of approval, the name of the program 602, a hash value of the program 604, and a signature of the program 606. In some embodiments, more or less information is maintained in the whitelist table 600.

In some embodiments, identification is by a hash value of the program 604 is provided in the whitelist table 600. The hash value of the program 604, for example is based upon a summation/modulus or other numerical calculation based upon the entire program or a portion of the program. Any tampering with the program by, for example, a hacker, will change the calculation, resulting in a mismatch between the calculated hash value and the hash value 604 from the whitelist table 600.

In some embodiments, identification is by a signature of the program 606 is provided in the whitelist table 600. The signature of the program 606, for example is based upon a probing of the entire program or a portion of the program. For example, the presence or absence of certain strings within the program, values at certain locations within the program, etc. Any tampering with the program for example, by a hacker, will change a calculation of the signature, resulting in not finding certain expected values within the signature based upon the signature 606 from the whitelist table 600.

Figure 8:
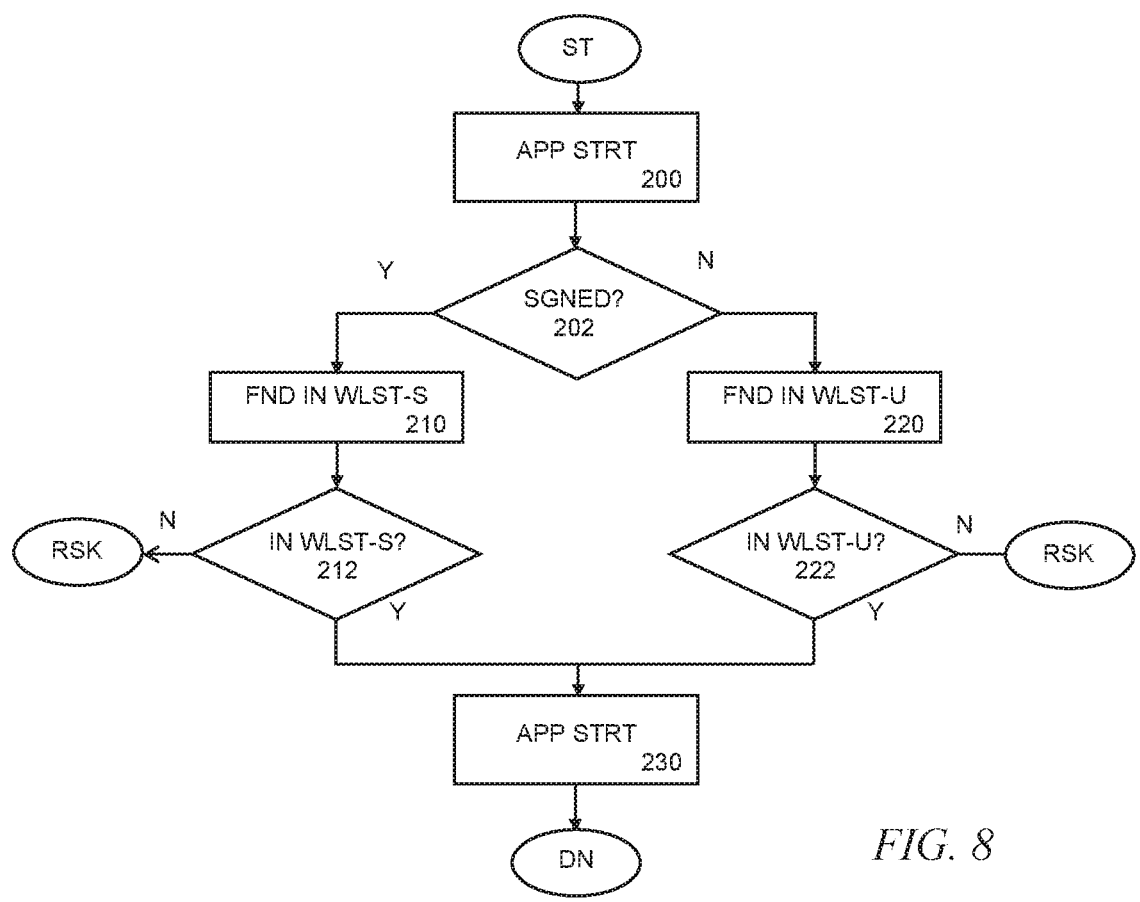
FIGS. 8-10 illustrate exemplary program flows of the computer security system.
Figure 9:
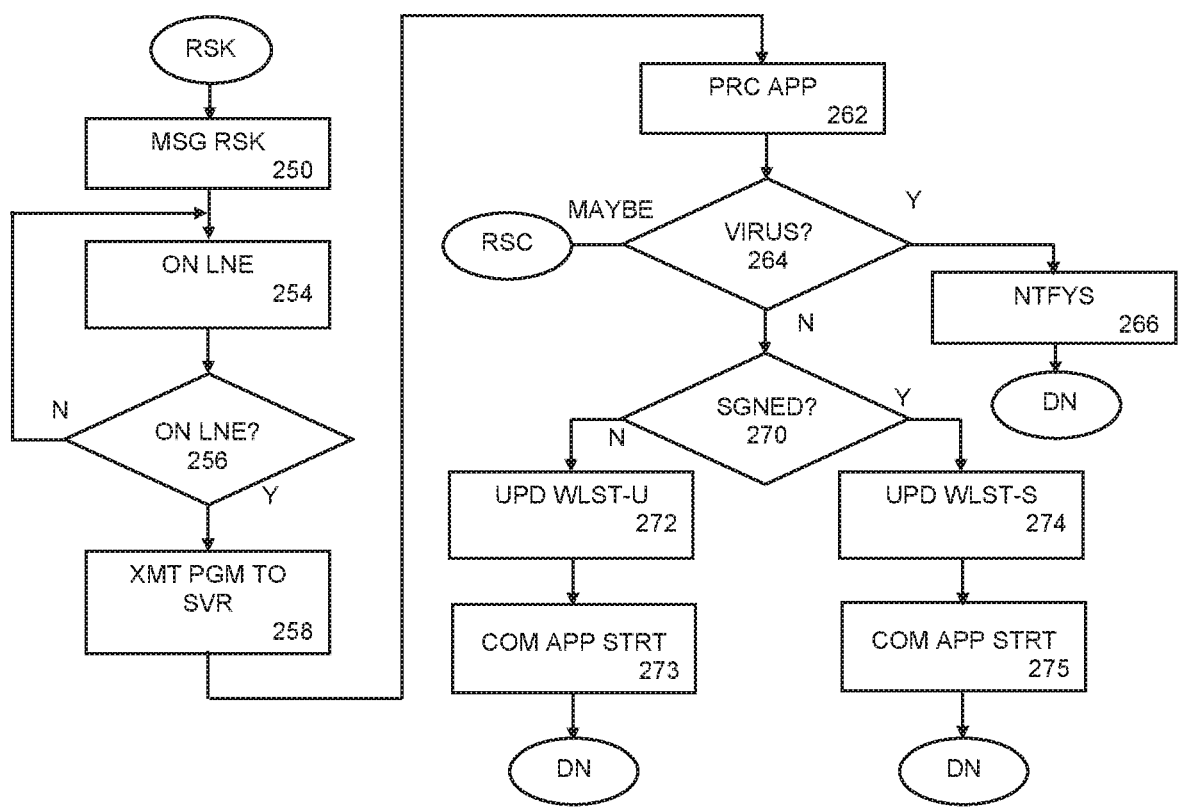
Figure 10:
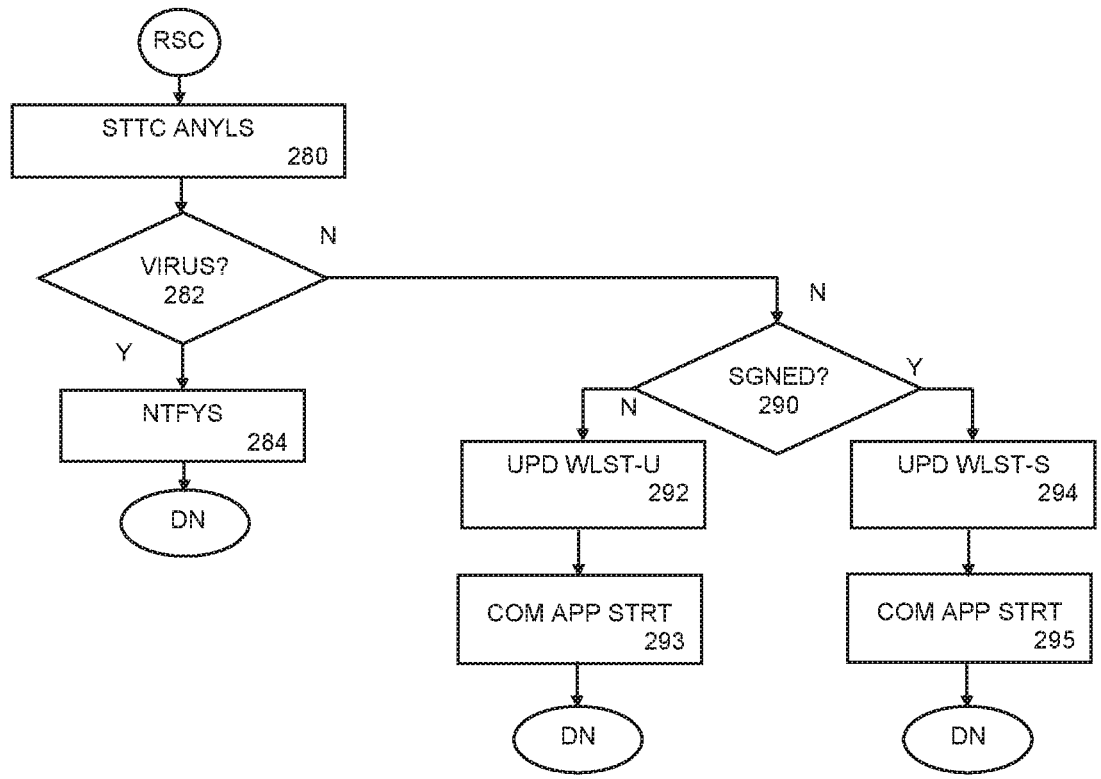

Referring to FIGS. 8-10, exemplary program flows of the system for providing access are shown.

It is anticipated that portions of the exemplary program flow execute on a user device such as a computer 10 while portions of the exemplary program flow execute on the server 500.

Although shown using two white lists, one for signed programs and one for unsigned programs, any number of whitelists is anticipated, including a single whitelist.

In this example, the flow starts by an executable attempting to start 200 on the computer. This step is anticipated to be performed through direct or indirect invocation by the user. In a direct invocation, the user knowingly executes an executable (e.g. software executable, application, etc.), for example, by double-clicking on a short-cut to that executable. In an indirect invocation, the user initiates execution of an executable by indirect ways such as browsing to a web site, opening an email attachment, etc.

The computer security system first determines 202 if the executable is signed. There are many ways to digitally sign a program. Signing includes a trusted identification, typically issued by a certification authority. It is believed that a signed executable is more trustworthy than an unsigned executable.

If it is determined 202 if the executable is signed, the signed-whitelist 12/512 is searched 210 to determine if the executable has been recorded in the signed-whitelist 12/512. If the searched determines 212 that the executable has been recorded in the signed-whitelist 12/512, the executable is trusted and that executable is started 230.

If it is determined 202 if the executable is unsigned, the unsigned-whitelist 14/514 is searched to determine 220 if the executable has been recorded in the unsigned-whitelist 14/514. If the searched determines 222 that the executable has been recorded in the unsigned-whitelist 14/514, the program is trusted and that executable is started 230.

Note that, in some embodiments, no whitelists are provided, only blacklists. In such, if the executable is on the black list, it is prevented from running. If the executable is not on the black list, the executable is analyzed for viruses.

If the executable was not found (e.g., the signed executable was not found in the signed whitelist 12/512 or the unsigned executable was not found in the unsigned whitelist 14/514, the computer 10 attempts communication with the server 500 for further analysis as per FIGS. 9 and 10.

In some embodiments, the computer security system of the computer 10 notifies 250 the user that some risk exists (e.g., the executable has not previously been checked and verified and on a white list) and that it will take time to perform the analysis on the executable before the user is allowed to run the executable.

A determination 254 is made to see if the computer 10 is online (e.g. can connect to the server 500). If the computer 10 is not online 256, the determination 254 is repeated (e.g. periodically) until the computer 10 is online 256, at which time the program is transferred 258 to the server 500 for analysis.

When the executable is received by the server, the executable is processed 262 by the computer security system through a series of static and heuristic tests to determine if the executable is digitally signed, to determine what information is populated by the executable (e.g. folders created, registry entries, etc.), to determine the name of the executable, to determine the publisher of the executable, to determine what directory the executable tries to execute out of, etc.

If the processing 262 determines 264 that there is malicious software within the executable, the computer 10 and/or user is notified 266. For example, the user is sent an email providing details of the malicious software that was prevented from running and perhaps instructions on how to prevent future intrusions of the malicious software to prevent the same thing from infecting their computer 10 in the future, etc. In some embodiments, the user is directed to a training course to help them learn how to prevent malicious software from getting into the computer 10.

If the processing 262 determines 264 that there is not malicious software in the executable, then if the program is signed 270, the signed whitelist 12/512 is updated 272 and the server communicates 273 with the computer 10 to allow running of the executable. If the processing 262 determines 264 that there is not malicious software, then if the executable is unsigned 270, the unsigned whitelist 14/514 is updated 274 and the server communicates 275 with the computer 10 to allow running of the executable.

Figure 12:
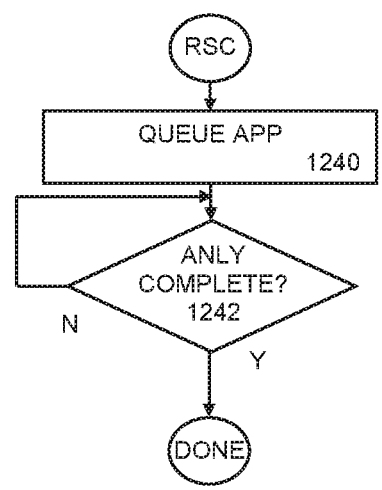
FIGS. 12-15 illustrate exemplary detailed program flows of the computer security system.

If the processing 262 determines 264 that there may be malicious software in the executable, further research and analysis is performed on the executable as shown in FIG. 12. Static and/or dynamic analysis 280 is performed on the executable by, for example, installing the executable in a sand box (e.g. a clean computer that is isolated). The analysis 280 includes scanning the executable with commercially available malicious software scan systems (e.g. 40 to 50 commercial malicious software scan engines). If the scan does not flag the executable as having malicious software, then the executable is further analyzed by a staff member to research behaviors of the executable and further determine if malicious software is present in the executable.

If the analysis 280 determines 282 that there is not malicious software in the executable, then if the executable is unsigned 290, the unsigned whitelist 14/514 is updated 292 and the server communicates 293 with the computer 10 to allow running of the program. If the analysis 280 determines 282 that there is not malicious software, then if the executable is signed 290, the signed whitelist 14/514 is updated 294 and the server communicates 295 with the computer 10 to allow running of the executable.

If the analysis 280 determines 282 that there is malicious software in the executable, the computer 10 and/or user is notified 284. For example, the user is sent an email providing details of the malicious software and perhaps instructions on how to remove the malicious software as well as how to prevent the same thing from infecting their computer 10 in the future, etc. In some embodiments, the user is directed to a training course to help them learn how to prevent malicious software from getting into the computer 10.

Note that in some embodiments, execution of an unknown executable is blocked (e.g. the user is told that the application cannot be run until analysis is complete) and the executable is sent for analysis. It is anticipated that the analysis will take time (e.g., hours, days) and it does not make sense to keep the user waiting for the analysis. Instead, the user is notified that the application has been blocked and told to try again later. If the analysis does not find malicious software, the executable will eventually be added to one of the white lists 12/512/14/514 and, later, when the user attempts to rerun the executable, it is cleared for running by being on one of the whitelists 12/512/14/514.

Figure 11:
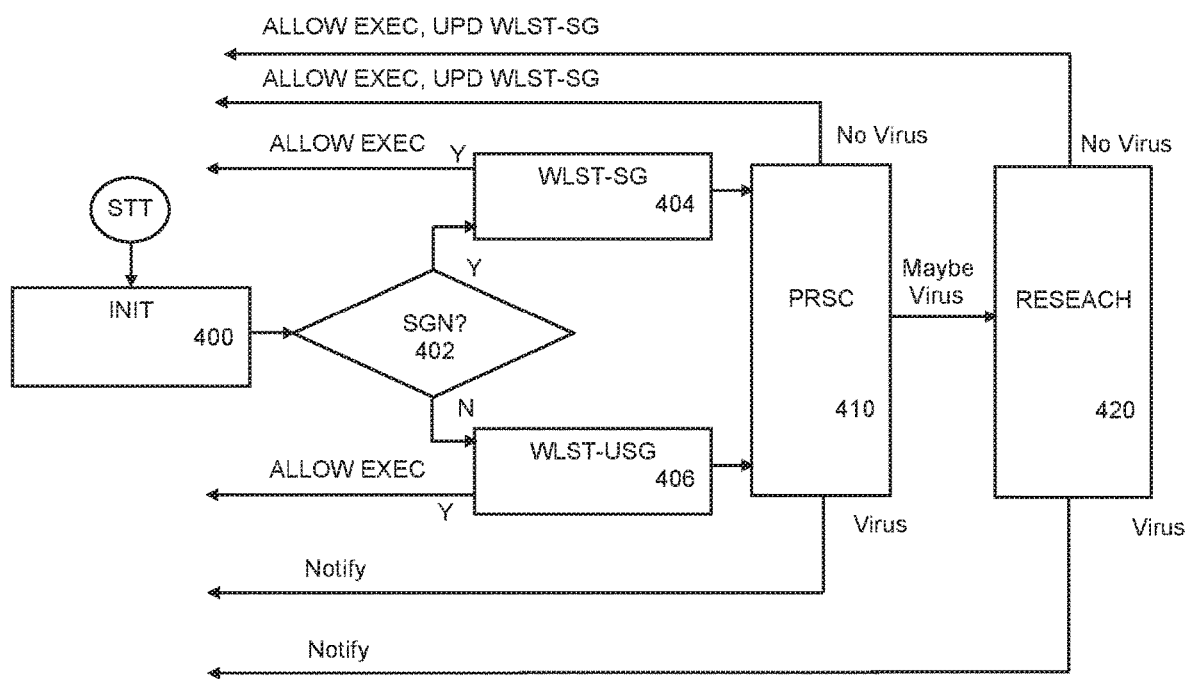
FIG. 11 illustrates an exemplary decision process of the computer security system.

In FIG. 11, a graphical representation of the computer security system is shown. An executable tries to initiate 400 on the computer 10. If the executable is signed, the signed whitelist 12/512 is checked 404 and if there, the executable is allowed to execute. If the executable is unsigned, the unsigned whitelist 14/514 is checked 406 and if there, the executable is allowed to execute.

If not in the respective whitelist 12/14/512/514, the executable is processed 410 using a series of static and dynamic tests to determine if the executable is digitally signed, to determine what information is populated by the executable (e.g. folders created, registry entries, etc.), the name of the executable, the publisher of the executable, what directory the executable tries to execute out of, etc.

In some embodiments, a blacklist 411 is maintained and part of when the executable is processed 410, the blacklist 411 is consulted and if the executable is on the blacklist 411, it is automatically declared as having a virus. If the processing 410 determines that there is not malicious software, then the respective whitelist 12/14/512/514 is updated and the executable is allowed to run.

If the processing 410 of the computer security system determines that there is malicious software in the executable, the computer 10 and/or user is notified. For example, the user is sent an email providing details of the malicious software and perhaps instructions on how to remove the malicious software as well as how to prevent the same thing from infecting their computer 10 in the future, etc. In some embodiments, the user is directed to a training course to help them learn how to prevent malicious software from getting into the computer 10.

If the processing 410 determines that there may be malicious software in the executable, further research and analysis 420 is performed on the executable. Static analysis is performed on the executable by installing the program in a sand box (e.g. a clean computer that is isolated). The static analysis includes scanning the executable with commercially available malicious software scan systems (e.g. 40 to 50 commercial malicious software scan engines). If the scan does not flag the executable as having malicious software, then the executable is further analyzed by a staff member to research behaviors of the executable and further determine if malicious software is present in the executable.

If the research and analysis 420 determines that there is not malicious software in the executable, then the respective whitelist 12/14/512/514 is updated and the executable is allowed to run.

If the research and analysis 420 determines that there is malicious software in the executable, the computer 10 and/or user is notified. For example, the user is sent an email providing details of the malicious software and perhaps instructions on how to remove the malicious software as well as how to prevent the same thing from infecting their computer 10 in the future, etc. In some embodiments, the user is directed to a training course to help them learn how to prevent malicious software from getting into the computer 10.

Referring to FIGS. 12-15, exemplary detailed program flows of the computer security system are shown. When a new application is found, for example, an application that is not currently identified in any whitelist or blacklist, before allowing the application to run, the application is uploaded to a server 500 for further analysis and, if that analysis signals the application is dangerous, the application is added to the blacklist of all devices. If analysis signals that the application is not dangerous, the application is added to the whitelist of all devices and allowed to run. Although many forms of analysis are anticipated, the following flowcharts center upon three main forms of analysis, including: running known virus scanners on the application to see if the known virus scanners find a virus; searching the application using regular expressions (e.g. text/wildcard strings) that are used to find text patterns common to certain classes of viruses; and running the application in a clean environment to determine if the application attempts any malicious actions such as editing the registry, sending data to a remote site, etc.

As discussed in FIGS. 8-10, the flow starts by an executable attempting to start 200 on the computer. This step is anticipated to be performed through direct or indirect invocation by the user. In a direct invocation, the user knowingly executes an executable (e.g. software executable, application, etc.), for example, by double-clicking on a short-cut to that executable. In an indirect invocation, the user initiates execution of an executable by indirect ways such as browsing to a web site, opening an email attachment, etc. In such, if the executable is not known (e.g., the executable or application is not in a whitelist or blacklist), the computer 10 attempts communication with the server 500 for further analysis as per FIGS. 12-14.

As in FIG. 9, a determination 254 is made to see if the computer 10 is online (e.g. can connect to the server 500). If the computer 10 is not online 256, the determination 254 is repeated (e.g. periodically) until the computer 10 is online 256, at which time the program is transferred 258 to the server 500 for analysis.

Per FIG. 12, when the executable is received by the server, the executable is placed in queue 1240 for further analysis.

Once the analysis is complete 1242, the results of the analysis (e.g. no virus found or virus found) is returned. If there is malicious software within the executable, the computer 10 and/or user is notified. For example, the user is sent an email providing details of the malicious software and perhaps instructions on how to remove the malicious software as well as how to prevent the same thing from infecting their computer 10 in the future, etc. In some embodiments, the user is directed to a training course to help them learn how to prevent malicious software from getting into the computer 10. The whitelist and blacklist are updated appropriately to prevent operation of any malicious software in the future.

Figure 13:
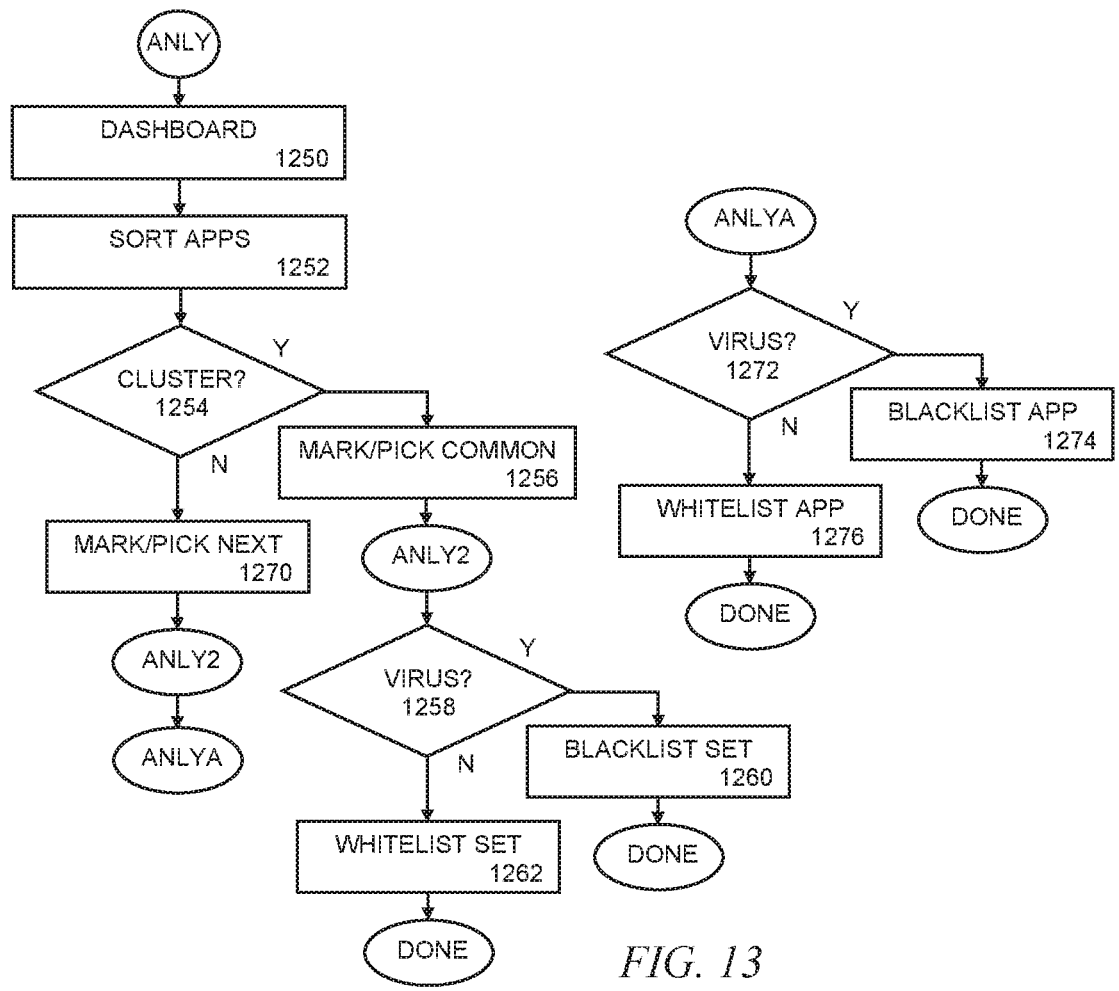

Further research and analysis are performed on the executable as shown in FIG. 13. Each researcher has a dashboard 1250 showing the status of different applications that are in queue. The dashboard shows various attributes of each application that is in queue 1250 such as the size of each application, the name of each application, a hash value of each application, execution parameters provided to each application (e.g. command-line parameters), etc. In some embodiments, the dashboard has sorting capabilities and the applications are sorted 1252 by any of the various attributes. For example, sorting by size, the researcher has the ability to recognize multiple applications having the same size. Through sorting, the researcher can cluster testing of such. Note that as an infected application spreads, it is anticipated that multiple users will be infected with the same virus, so that same file will eventually by entered on the queue by multiple users and that file may share common attributes such as size, file name, etc.

If clustering is possible 1254, the researcher marks the cluster as being analyzed (so another researcher doesn't repeat the same work) and the researcher picks one application 1256 of the cluster for further analysis and runs analysis (ANLY2) on the selected application. If the analysis (ANLY2) indicates 1258 that the selected application has a virus, the selected set of applications in queue are marked as viruses and the application is added 1260 to the blacklist. If the analysis (ANLY2) indicates 1258 that the selected application does not have a virus, the selected set of applications in queue are marked as clean and the application is added 1262 to the whitelist.

If clustering is not possible 1254, the researcher picks the next application 1270 further analysis and runs analysis (ANLY2) on selected application. If the analysis (ANLY2) indicates 1272 that this application has a virus, the application is marked as viruses and the application is added 1260 to the blacklist. If the analysis (ANLY2) indicates 1272 that this application does not have a virus, the applications is marked as clean and the application is added 1276 to the whitelist.

Figure 14:
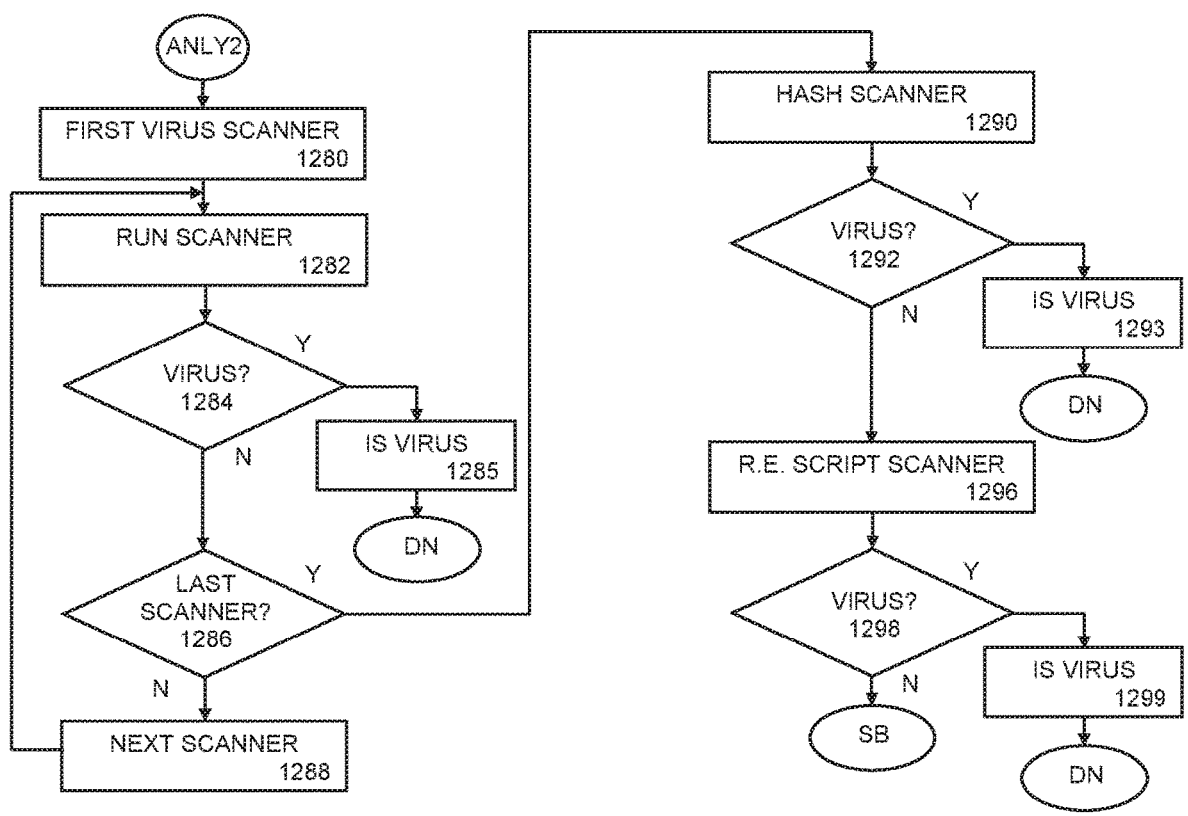

In FIG. 14, the analysis (ANLY2) is shown. Note that the analysis is shown in a particular order (virus scanners, sandbox, search using regular expressions), but any order is anticipated.

The analysis begins by selecting a first virus scanner 1280 from a set of available, licensed, industry virus scanners, as one of the industry virus scanners may have already experienced a virus that is embedded in the application. Note that, in some embodiments, details of the application (e.g. executable) are posted and/or application (executable) itself is sent to the scanning engine (e.g. through the internet) and all of the virus scan engines are run and the results are returned. Therefore, either manually running the industry scanners or using automated software to run all (or a set of) the industry scanners is performed.

Now, in a loop, the current virus scanner is run 1282 and, if a virus is detected 1284 by that virus scanner (is virus 1285), it is declared that there is a virus 1285 and further analysis is not performed. Note that in some embodiments, throughout the analysis, a researcher is monitoring progress and has the ability to change or override whatever the software system uncovers.

In some embodiments, all virus scanners are run and then the results from each of the virus scanners are weighed to arrive at a decision as to whether the application includes malicious software, as the dependability of the many available virus scanners varies.

If no virus was detected 1284 by the current virus scanner and the current virus scanner is not the last virus scanner 1286, the next virus scanner 1288 is loaded and the loop continues.

If no virus was detected 1284 by the current virus scanner and the current virus scanner is the last virus scanner 1286, running of the industry virus scanners is complete and the next set of scans are made. The first is a hash scanner 1290 that looks for known viruses using hash algorithms. If the hash scanner finds a virus 1292, it is declared that there is a virus 1293 and further analysis is not performed.

Next, a script of regular expressions is run 1296 to look for text strings of known viruses. It is known that even though certain viruses hide themselves by changing file size, changing file name, etc., there is typically one or more internal strings that do not change. For example, some viruses have a specific form of their name (e.g. 4 digits followed by some numbers of letters followed by two digits) or have internal strings such as a file transfer address that will receive stolen information or links to possible email application, etc. If the scan using these regular expressions finds a virus 1298, it is declared that there is a virus 1299 and further analysis is not performed. Otherwise sandbox evaluation (SB) is performed.

Figure 15:
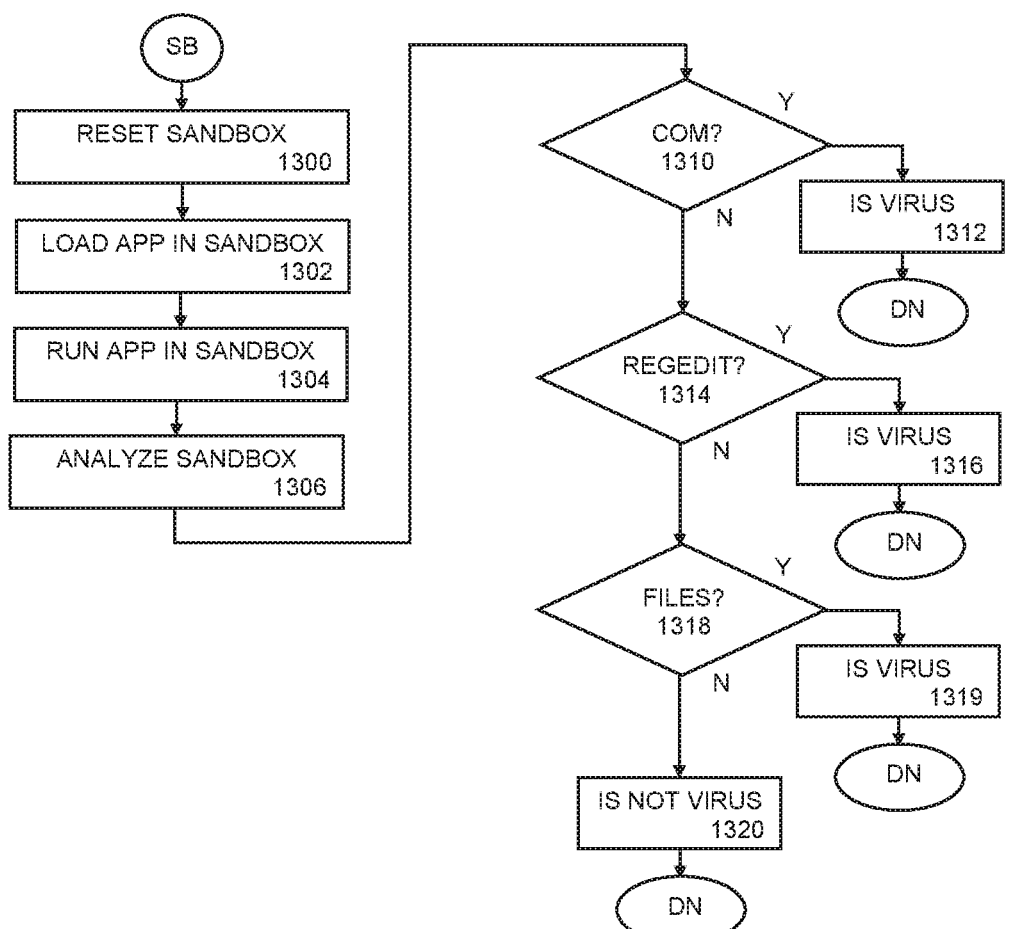

In FIG. 15, an exemplary sandbox analysis (SB) is shown. A sandbox is basically an execution environment that is tightly monitored to allow the application to run, then see if the application has attempted to perform any malicious tasks. The sandbox appears to have internet and network access, but it does not have true internet or network access so that if the application includes a virus, the virus cannot spread from operation within the sandbox (e.g., the sandbox is isolated). Some more intelligent viruses detect when they are running in a sandbox and behave during such (e.g. do not attempt to read/write the registry). For those, in some embodiments, the sandbox is a fully loaded and equipped computer on which the application is run. Therefore, after each run of an application, this fully loaded computer must be reloaded (fresh operating system, file system, registry, etc.).

The sandbox analysis (SB) starts with resetting the sandbox 1300 (or reloading a base software load onto the target computer system). Then, the application is loaded 1302 into the sandbox (or onto the fully loaded computer) and the application is run 1304. In some embodiments, the application is provided with command-line parameters as were provided when the application attempted to run on the computer. In some embodiments, the invoking application is identified to aid in research (e.g. the application was invoked by MS-WORD®).

After running, the sandbox (or fully loaded computer) is analyzed for input/output operations (communications ports are monitored), file system changes, changes made to the registry by the application, attempts to access other applications (e.g. email programs), file reads, communication connections, display activity such as pop-up windows (e.g. ransom windows), etc.

For example, the communications and communication attempts are reviewed by the researcher and, if malicious communications are performed by the application, it is declared that there is a virus 1312 and further analysis is not performed unless determined to be prudent by the researcher.

Next operations to the registry are checked 1314 (e.g. comparing the registry after running the application to the registry before running the application) and the researcher determines if the application made any malicious changes to the registry. If malicious changes to the registry are made 1314 by the application, it is declared that there is a virus 1316 and further analysis is not performed unless determined to be prudent by the researcher.

Next operations to the file system are checked 1318 (e.g. determining what files were changed/created after running the application) and the researcher determines if the application made any malicious changes to the files or if the application followed a known pattern of file changes/creations. If malicious changes to the files are made 1318 by the application, it is declared that there is a virus 1319 and further analysis is not performed unless determined to be prudent by the researcher.

It is anticipated that other analysis be performed. If the analysis determines that there is not a virus, it is declared that the allocation is not a virus 1320 and the analysis completes.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for computer security, the system comprising:
at least one whitelist;
a server, the server having storage;
a computer protected by the system for computer security;
software running on the computer detecting an attempt to run an application, the software determining if the application is in the at least one whitelist and if the application is present in the at least one whitelist, the software running on the computer allows the running of the application;
if the application is not found in the at least one whitelist, execution is blocked and at least a portion of the application is forwarded to the server for further analyzes;
at the server, a researcher selects the application for analysis and performs the analysis on the application using one or more industry virus scanners against the application;
if the one or more industry virus scanners collectively detects that malicious software exists in the application, the server notifies regarding a malicious software application and the application is blocked;
if the one or more industry virus scanners fail to detect any malicious software in the application, then further analysis is performed;
if the further analysis indicates that no malicious software exists in the application, the server updates one or more of the at least one whitelist, and if the further analysis indicates that that there may be malicious software in application, future execution of the application is blocked;
wherein the further research includes running the application in a sandbox and analyzing of a file system of the sandbox, a registry of the sandbox, an input/output subsystem of the sandbox and a communications port of the sandbox, and if the analyzing indicates that there is a virus in the application, the application is added to at least one blacklist and future execution of the application is blocked; and
whereas the server notifies regarding the malicious software by sending an email to a user of the computer.

2. The system of claim 1, wherein the at least one whitelist and the at least one blacklist are stored and accessed from storage associated with the server.

3. The system of claim 2, wherein the further research includes reviewing at least two hash values of the application determined from at least two hash algorithms and if any of the at least two hash values is determined to be a hash value of the virus, the application is added to the at least one blacklist and future execution of the application is blocked.

4. The system of claim 1, wherein the further research includes searching for patterns in the application using regular expressions and if a pattern known to be the virus is found, the application is added to the at least one blacklist and future execution of the application is blocked.

5. The system of claim 1, wherein when the at least the portion of the application is forwarded to the server for further the analyzes, an identification of an invoking application and any command-line parameters are also forwarded to the server.

6. The system of claim 1, wherein the email includes a description of the malicious software and links to training on how to prevent future intrusions of the malicious software into the computer.

7. A method for computer security, the method comprising:
providing at least one whitelist, a server having a storage, and a computer protected by the method for computer security;
detecting an attempt to run an application;
determining if the application is in the at least one whitelist and if the application is present in the at least one whitelist, allowing the running of the application;

if the application is not found in the at least one whitelist, blocking execution and forwarding at least a portion of the application to the server for further analyzes;

at the server, a researcher selecting the application for analysis and performing the analysis on the application using one or more industry virus scanners against the application;

if the one or more industry virus scanners collectively detects that malicious software exists in the application, the server notifies regarding a malicious software application and the application is blocked;

if the one or more industry virus scanners fail to detect any malicious software in the application, then further analysis is performed;

if the further analysis indicates that no malicious software exists in the application, the server updates one or more of the at least one whitelist, and if the further analysis indicates that that there may be malicious software in application, future execution of the application is blocked;

wherein the further research includes running the application in a sandbox and analyzing of a file system of the sandbox, a registry of the sandbox, an input/output subsystem of the sandbox and a communications port of the sandbox, and if the analyzing indicates that there is a virus in the application, the application is added to at least one blacklist and future execution of the application is blocked; and whereas the server notifies regarding the malicious software by sending an email to a user of the computer.

8. The method of claim 7, wherein the at least one whitelist and the at least one blacklist are stored and accessed from storage associated with the server.

9. The method of claim 7, wherein the further research includes searching for patterns in the application using regular expressions and if a pattern known to be the virus is found, the application is added to the at least one blacklist and future execution of the application is blocked.

10. The method of claim 7, wherein the further research includes reviewing at least two hash values of the application determined from at least two hash algorithms and if any of the at least two hash values is determined to be a hash value of the virus, the application is added to the at least one blacklist and future execution of the application is blocked.

11. The method of claim 7, wherein when the at least the portion of the application is forwarded to the server for further the analyzes, an identification of an invoking application and any command-line parameters are also forwarded to the server.

12. The method of claim 7, wherein the email includes a description of the malicious software and links to training on how to prevent future intrusions of the malicious software into the computer.

13. A computer program product for providing security to a computer comprising:

a non-transitory storage medium having computer readable instructions stored therewith, the computer readable instructions being executable by a processor and comprising:

the computer readable instructions running on the computer detecting an attempt to run an application, the computer readable instructions running on the computer determining if the application is in at least one whitelist and if the application is present in the at least one whitelist, the computer readable instructions running on the computer allows the running of the application;

if the application is not found in the at least one whitelist, the computer readable instructions running on the computer block execution of the application and at least a portion of the application is forwarded to a server for further analyzes;

the computer readable instructions running on the server select the application for analysis and perform the analysis on the application using one or more industry virus scanners against the application;

if the one or more industry virus scanners collectively detects that malicious software exists in the application, the computer readable instructions running on the server notifies regarding a malicious software application and the application is blocked;

if the one or more industry virus scanners fail to detect any malicious software in the application, then further analysis is performed;

if the further analysis indicates that no malicious software exists in the application, the computer readable instructions running on the server updates one or more of the at least one whitelist, and if the further analysis indicates that that there may be malicious software in application, future execution of the application is blocked;

wherein the further research includes the computer readable instructions running on the server running the application in a sandbox and analyzing of a file system of the sandbox, a registry of the sandbox, an input/output subsystem of the sandbox and a communications port of the sandbox, and if the analyzing indicates that there is a virus in the application, the computer readable instructions running on the server add the application to at least one blacklist and future execution of the application is blocked; and whereas the computer readable instructions running on the server notifies regarding the malicious software by sending an email to a user of the computer.

14. The computer program product of claim 13, wherein the at least one whitelist and the at least one blacklist are stored and accessed from storage associated with the server.

15. The computer program product of claim 13, wherein the further research includes the computer readable instructions running on the server searching for patterns in the application using regular expressions and if a pattern known to be the virus is found, the computer readable instructions running on the server adds the application to the at least one blacklist and future execution of the application is blocked.

16. The computer program product of claim 13, wherein the further research includes the computer readable instructions running on the server reviewing at least two hash values of the application determined from at least two hash algorithms and if any of the at least two hash values is determined to be a hash value of the virus, the computer readable instructions running on the server adds the application to the at least one blacklist and future execution of the application is blocked.

17. The computer program product of claim 13, wherein when the at least the portion of the application is forwarded to the server for further analyzes, an identification of an invoking application and any command-line parameters are also forwarded to the server.

18. The computer program product of claim 13, wherein the email includes a description of the malicious software and links to training on how to prevent future intrusions of the malicious software into the computer.

* * * * *